Oct. 10, 1944.                R. L. RAPP                2,360,274
                          FASTENING DEVICE
                        Filed May 7, 1942
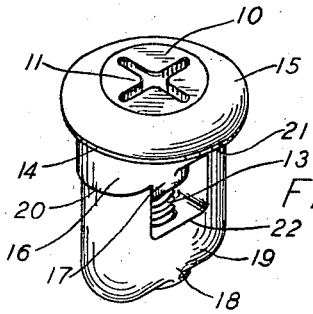
FIG. I
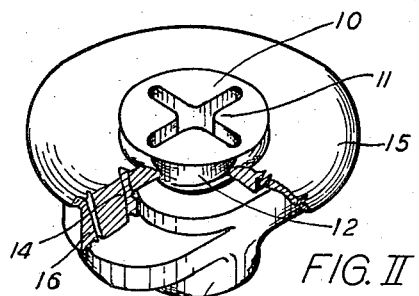
FIG. II
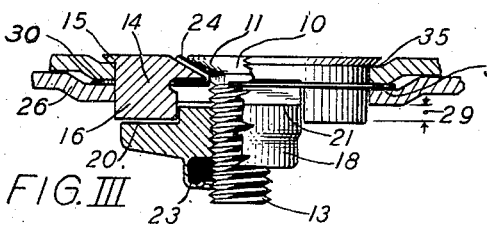
FIG. III
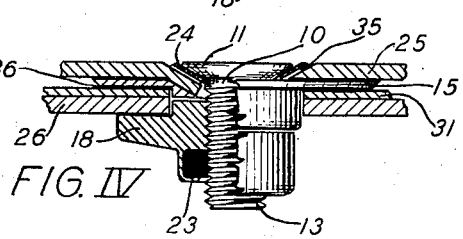
FIG. IV
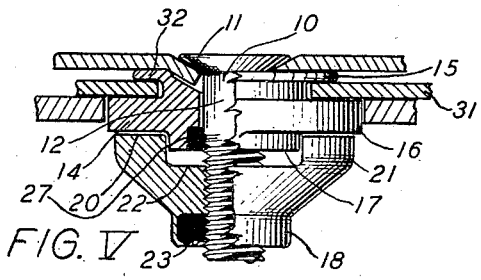
FIG. V
FIG. VII
FIG. VI
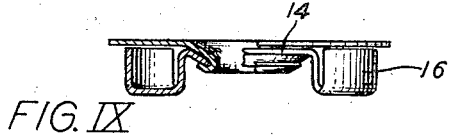
FIG. IX
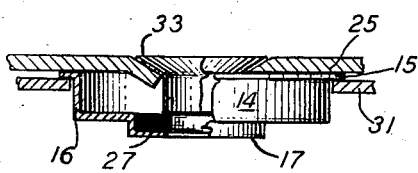
FIG. VIII
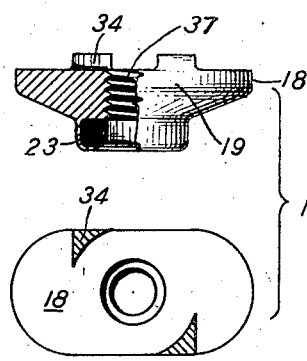
FIG. X
ROBERT L. RAPP
INVENTOR.
BY George C. Sullivan Patented Oct. 10, 1944

2,360,274

UNITED STATES PATENT OFFICE 2,360,274

FASTENING DEVICE

Robert L. Rapp, Burbank, Calif.

Application May 7, 1942, Serial No. 442,015

6 Claims. (Cl. 151—7)

This invention relates to improvements in fastening devices, and more particularly to fastening devices which may be installed and operated from one side of a structure, more commonly known as "blind" installations. In other words, it is particularly useful as a coupling or fastener to make a connection between members, such as plates or sheets of material, wherein such members are only accessible from one side. My invention is particularly useful as a fastener in an installation wherein a structurally sound attachment is required, that is, where the fastener is to withstand certain loads, such as tension, shear, bending and bearing loads.

The invention is particularly useful when applied to the construction and repair of aircraft, for airplanes usually consist of a number of assembled structures which, in most instances, are required to be readily disassembled in order to provide access to the internal workings for proper maintenance and service as well as repairs. The fastener may be used to great advantage in many other industries, such as the automobile, household appliances, farm machinery, heavy equipment, and many others.

It may be said, therefore, that my invention has for its general object the provision of a fastening device which is capable of installations in assembled structures which are accessible from one side only, and where the device is required to carry a load from one part of the structure to another.

It is an object of my invention to provide a fastener which may be made gas or liquid tight, which is particularly useful in the construction and repair of closed assemblies and containers, such as pressure vessels, tanks and the like.

It is a further object of my invention to provide a fastener having a screw or bolt adapted to operate the device, the fastener being of such a construction that any type of head may be used, such as the common "round" head, the "button" head, the "counter-sunk" flush type head, the common "raised" type head such as the hexagonal head, and many others. This is very desirable in that it provides an attachment that can be made for any type of surface condition, that is, flush, oval, square or with any artistic design.

A further object of my invention is to provide a fastener which has advantageous features, such as, simple and economical construction, fool-proof and self-locking qualities, a construction not requiring a washer under the nut to prevent marring the structure, and a construction which will prevent the fastening from working loose as a result of vibration. Also, a pertinent feature of the design is that the construction is so simplified that the unit may be coupled and uncoupled merely by the employment of simple tools such as a screw driver or wrench; the fast operation, ease of operation and simplicity of construction thus making it a unit which may be adapted to mass production and use.

A further object of my invention is to provide a fastener which is generally adaptable to flush mounting as is so commonly required in the transportation industry, particularly the aircraft industry. For instance, in aircraft, a large number of fasteners are required to attach cowlings, inspection doors, panels, etc. In one cowling, there may be ten to twenty fastener units, thus making it desirable that the fasteners remain in, open or closed position as is directed by the operator so that the cowling will be readily locked or loosened from the assembly. It can be readily seen that in the operation of removing the cowling if a few of the loosened fasteners would jar or in some other manner return to a closed or semi-closed position, great difficulty would be encountered. It is therefore desirable that once a unit is brought to an opened position it should be maintained in that position until the cowling can be removed. My invention provides this advantageous feature.

Further objects of my invention will be evident upon reading the following description of the novel parts and combination of parts, all of which contribute to produce an efficient fastening device.

A preferred form of my invention which has been chosen for the purpose of illustration, is described in the following specification, while the broad scope of the invention is pointed out in the appended claims.

Referring to the drawing,

Figure I is a perspective view of one form of my improved fastening device showing the unit assembled and ready for insertion into an opening necessary for the operation of the fastener.

Figure II is a perspective view of a unit similar to Figure I except that the rotation control means and the locking means have been interchanged.

Figure III is a side view of a fastener unit inserted in a pair of structural elements, the sectional portion showing the unit in an opened position, the remaining portion showing the unit in the closed or clamped position.

Figure IV is substantially the same unit as Figure III except that the view is taken approximately ninety degrees therefrom, that is, along the minor axis of the unit, and is associated with a structure wherein the head of the unit is held between a pair of structural elements. The sectional portion discloses the unit in closed or clamped position while the remaining portion shows it in the opened position.

Figure V discloses a unit of the general type of Figure I except it being adapted to flush mounting in a structure similar to Figure IV.

Figure VI shows a unit similar to Figure V with the disclosure of a grommet means of attaching the sleeve to one of the structural elements. The sectional view shows the unit in closed position while the remaining portion is in the open position.

Figure VII discloses a general type of grommet.

Figure VIII illustrates the sleeve of the hollow type, which is particularly adapted to mass production as a stamped part.

Figure IX is a view of a similar unit as that shown in Figure VIII but disclosing a different construction of the same general type.

Figure X illustrates one of the many versions of the rotative element or nut which may be adapted to the fastener unit forming my invention. In this construction the control of the rotational movement of the nut with respect to the sleeve is provided by raised elements which restrict its movement in accordance with the invention.

Before proceeding with the detailed description of my invention, it should be stated that the preferred embodiment of my device comprises three main parts, a bolt, a sleeve and a rotating element. The bolt may be of any type of bolt, screw or rivet with any type of head, the drawing showing the round, button and the flush type. Likewise, the sleeve may be formed for the various types abovementioned. The rotating element, which according to the drawing may be more commonly termed "nut," may be of any of the various types of nuts now on the market or one particularly designed for this unit. The desired design would be such that, in the plan view, it has an elongated shape. It is to be understood that the various types of elements heretofore mentioned may be selected to form any combination in accordance with the requirements of its use.

In general, the fastener is constructed in such a manner that the sleeve and nut may fit into an elongated slot or opening in at least one of the structural elements which are to be fastened together. After the unit has been positioned in the slot, a rotative movement of the bolt, by the use of a screw driver or wrench, will rotate the unit approximately ninety degrees into the clamping position. Further movement will screw the nut closer to the head of the sleeve, thus clamping the structural elements, such as plates or sheets of metal, therebetween. By reversing the screw motion, the nut will loosen and rotate into a position substantially in alignment with the elongated portion of the sleeve. Thus, it will be seen that the fastener may be inserted and tightened up or loosened and taken out of the structural elements from one side only of the assembly.

It will be apparent from a study of this description and the accompanying drawing that probably the most interesting and desirable feature of my invention is that the fastener is so constructed that it will carry large structural loads. As an example, referring to Figure III, shear loads along the plane of the joint between the two sheets must actually shear all of the metal inserted in the slot or aperture, which means the summation of the horizontal area of the sleeve and the area of the bolt. In my construction, I prefer to have the bolt fit the bore in the sleeve quite snugly in order to have these two elements to structurally assist one another in carrying the shear loads in the plane of the joint between sheets. It is therefore desirable to fill the slot or aperture with a shear resisting material. It is quite important that the contour of the slot be substantially filled with metal, thus allowing a minimum of slip between the structural members, as well as providing a large amount of shear and bearing material. The fastener is well constructed for tension loads.

In order to insure rotation of the nut and also to resist vibration, I prefer to provide some type of friction-increasing means between the nut and the bolt. A number of different means are now being commonly used. I also provide means of some type cooperating with either the sleeve or the nut to control the limits of rotation of the nut. The most desired angular rotation is approximately ninety degrees.

In the development of this unit, we have found that in the operation of opening the unit from a closed or clamped position, a tendency to overrotate the bolt beyond the amount necessary to rotate the nut may permit the nut to jar into a semi-locked or locked position which is undesirable, particularly where a series of the units are used in a single panel of structural elements. To eliminate this tendency, I have found it advisable to provide some means of restricting relative motion between the bolt and the sleeve and structure. Several types of restricting means are disclosed in the figures.

Referring to the detail parts as shown by the various drawing, Figures I to VI in particular, 10 indicates a bolt having a head 11 and a shank 12 with screw threads 13 thereon. The element 14 which I call a "sleeve" is comprised principally of a head 15 to prevent complete passage of the unit through the opening of a plate, a shank 16 and a rotational control means 17. The rotative element 18 comprises in general, an elongated base 19, clamping faces 20 and 21, a concave portion 22 (in the preferred embodiment) and friction-increasing means 23. The element 14 and head 15 may be separate parts.

Figure I shows the unit in readiness for insertion into an elongated slot cut into the structural members which are desired to be fastened together. Figure II shows a similar unit in perspective view. These figures disclose substantially the invention as defined in my co-pending application, Serial No. 418,708.

Figures III to and including X disclose various other modifications of the said invention as heretofore described, the principal additional feature being the provision for restricting the tendency of the nut 18 when in the open position to rotate to a closed or semi-closed position. In Figures III and IV, I provide means to accomplish this desired result in the form of a washer, collar or grommet 24 made of spring material, rubber or other matter which increases the friction between the sleeve 14 or structural element 25 and the bolt head 11. In Figures V and VIII this feature is provided for by the frictional means 27 which may be in the form of a leather, fibre or metal insert or gasket. Figure VI shows this provision in the form of spring bearing elements 28.

Figure III illustrates a unit in opened sectional position, and in a closed external view. In the closed or clamping position view, the nut 18 is rotated approximately ninety degrees, in such a manner that the clamping faces 20 and 21 slide over the shank 16 of the sleeve 14. In this manner, it is seen that the nut 18 is locked with the sleeve 14, because of the overlap 29, thus preventing any possibility of the unit working loose. This self-locking feature is very desirable. The sleeve 14 is held to the structural element 25 which is attached to the element 26 by means of a spring clip 30.

Figure IV represents substantially the unit of Figure III adapted to an installation wherein the unit is held in position between two structural members. In this case the spring clip 30 is not required. This adaptation requires only a circular hole in the element 25 but preferably requires an elongated slot in the cooperating structural element 31. The element 26 which is to be fastened by the unit has an elongated slot therein. In the event wherein there is only one structural member instead of two as shown by this figure, the head 15 can be attached to the element 25 by means of rivets, spot welds or the like.

Figures V and VI show various means of attaching the unit to the elements 25 and/or 31. In the first case the sleeve 14 has an integral lip 32 which prior to being mushroomed by suitable tools into the position shown, is vertical so that it can be readily inserted into the slot in the structural element. In the second case, the sleeve 14 is attached to the element 25 by means of a collar 33 which can be mushroomed into the position shown in the drawing.

In Figure VIII the collar 33 only holds the insert 27 in its place, the sleeve 14 being attached to element 25 by clamping the head 15 thereof between the elements 25 and 31. If desired, it may be attached by the use of the collar 33 being carried into the cammed surface 17 by a press or screw fit between the surface 17 and the collar 33. In this event the insert 27, if required, can contact the bolt shank at intervals around its periphery. It may also be attached, when the element 31 is not being used, to the element 25 by means of rivets or welds between the head 15 of the sleeve 14 and the element 25.

Figure IX discloses a sleeve 14 which is similar to the sleeve 14 of Figure VIII except that it is designed particularly as a stamped part which is particularly economical to construct. Figure X shows a nut 18 which is typical of this invention and which has a slightly different type of rotational control means, such means consisting of raised elements 34 to limit the rotation of the nut.

In all of the versions of my invention as described herein, the structural elements or sheets 25, 26 and/or 31 are held rigidly together because of the clamping action between the faces 20 and 21 of the nut 18 and the head 15 of the sleeve 14 or the head 11 of the bolt 10. In order to control the rotation of the nut 18, I provide a cammed surface 17 or raised elements 34 which limit the action of the nut 18 according to predetermined design. I prefer that the nut 18 be allowed to rotate approximately ninety degrees thus permitting the self-locking feature heretofore described.

The nut 18 has a threaded hole 37, the threads of which are matched with screw threads 13 of the bolt 10. It is thus seen that the rotation of the nut 18 is predicated upon the friction of the threads between the bolt 10 and the nut 18. This friction is normally sufficient, however, in order to insure that the friction is sufficient, I prefer to provide a friction-increasing means 23, which in the illustrated case is represented by an insert which may be made of fiber, rubber, leather, soft metal or the like. After assembly of the unit, the end of the bolt 10 may be peened to prevent loss of the nut 18. I have found that the peened end and the normal friction of the threads without the insert is a workable combination, however, I prefer the use of an insert, or its equivalent, especially where the unit is used in aircraft installations. It is to be understood that many other types of friction-increasing means may be used in lieu of the insert principle. Figures III to VI disclose the details of the illustrated insert means.

This construction is particularly advantageous as it may be made liquid or gas tight by the insertion of gaskets or the like at the proper points. For instance, referring to Figures III and IV, gaskets or other sealing means may be employed at 35 and 36, or the collar 24 may be made of a gasket material having sealing properties, thus accomplishing the desired result. It is apparent that my invention is readily usable in replacing standard nut and bolt combinations wherein the nut must be secured to the back plate, especially when the nut must be used in an inaccessible position.

This application is a continuation-in-part of my co-pending application Serial No. 418,708 filed November 12, 1941.

It is to be understood that the embodiments of the invention described herein may vary in many details, and I do not wish to be limited in the practice of the invention nor in the claims to the particular embodiments set forth. It is apparent that numerous changes in construction and rearrangements of the parts may be resorted to without departing from the scope of the invention as defined by the claims.

I claim as my invention:

1. A fastening device comprising in combination, a bolt, a rotating element to be passed through an opening in a sheet of material, a sleeve to be positioned within the opening and having a bore to permit passage of said bolt therethrough, limiting means formed by the relationship between said rotating element and said sleeve to control rotational movement therebetween, restricting means to minimize relative movement between said bolt and said sleeve, and means connecting the bolt and rotating element to provide movement in unison whereby the rotating element may be turned to a locking position upon advancing rotation of said bolt.

2. A fastening device comprising in combination, a bolt having a driving head and shank, an elongated rotating element adapted to be passed through a slot in a sheet of material, an elongated sleeve adapted to be positioned within the slot and having a bore to permit passage of said bolt therethrough, said sleeve having an expanded head to prevent complete passage through the slot, restricting means to minimize relative movement between said bolt and said sleeve, said rotating element being so arranged and constructed relative to said sleeve that upon advancing rotation of said bolt the rotating element will revolve substantially ninety degrees to lock the assembly.

3. In a fastening device to be secured to an elongated opening in at least one sheet of material, the combination of a bolt, a rotating element capable of passing through said opening, a sleeve to be positioned within the opening and having a bore to permit passage of said bolt therethrough, said sleeve having an expanded head to prevent complete passage through the opening and an elongated shank substantially conforming to the contour of the opening, limiting means to control rotational movement of said rotating element relative to said sleeve, restricting means to minimize relative movement between said bolt and said sleeve, and means connecting the bolt and rotating element to provide movement in unison within the range determined by said limiting means whereby the rotating element may be turned to a locking or unlocking position by driving or retracting the bolt.

4. In a fastening device to be secured to at least one sheet of material, the combination of a bolt, an elongated rotating element suspended to said bolt and being capable of passing through an elongated opening, an elongated sleeve positioned within the opening and conforming substantially to the contour thereof, said sleeve having a bore to permit passage of said bolt therethrough, limiting means formed by the relationship between said rotating element and said sleeve to control rotational movement of said rotating element relative to said sleeve, restricting means to minimize relative movement between said bolt and said sleeve, and means actuated by the advancing rotation of said bolt to provide rotational movement of said rotating element relative to said sleeve whereby said element may be turned substantially ninety degrees to lock the assembly.

5. A fastening device comprising in combination, a bolt, an elongated rotating element capable of passing through an opening in at least one sheet of material and having clamping surfaces thereon, an elongated sleeve to be positioned within said opening having a bore to permit passage of said bolt therethrough, and including an expanded head to prevent complete passage through said opening, said sleeve including a limiting means to control rotational movement of said rotating element relative to said sleeve, restricting means to minimize relative movement between said bolt and said sleeve, said rotating element and said sleeve being so arranged and constructed that upon advancing rotation of said bolt the clamping surfaces of said element revolve into tightening position to lock the assembly.

6. A fastening device comprising in combination, a bolt, an elongated sleeve to be positioned within an opening in at least one sheet of material and having a bore to permit passage of said bolt therethrough, said sleeve including an expanded head to prevent complete passage through said opening and an elongated shank substantially conforming to the contour of said opening, restricting means to minimize relative movement between said bolt and said sleeve, an elongated rotating element capable of passing through said opening and having clamping surfaces thereon, said rotating element including a limiting means to control rotational movement of said rotating element relative to said sleeve and being so arranged and constructed that upon advancing rotation of said bolt the clamping surfaces of said element revolve into tightening position to lock the assembly.

ROBERT L. RAPP.